T. E. BISSELL.
DISK HARROW.
APPLICATION FILED AUG. 14, 1920.
1,388,159.
Patented Aug. 23, 1921.
2 SHEETS—SHEET 1.
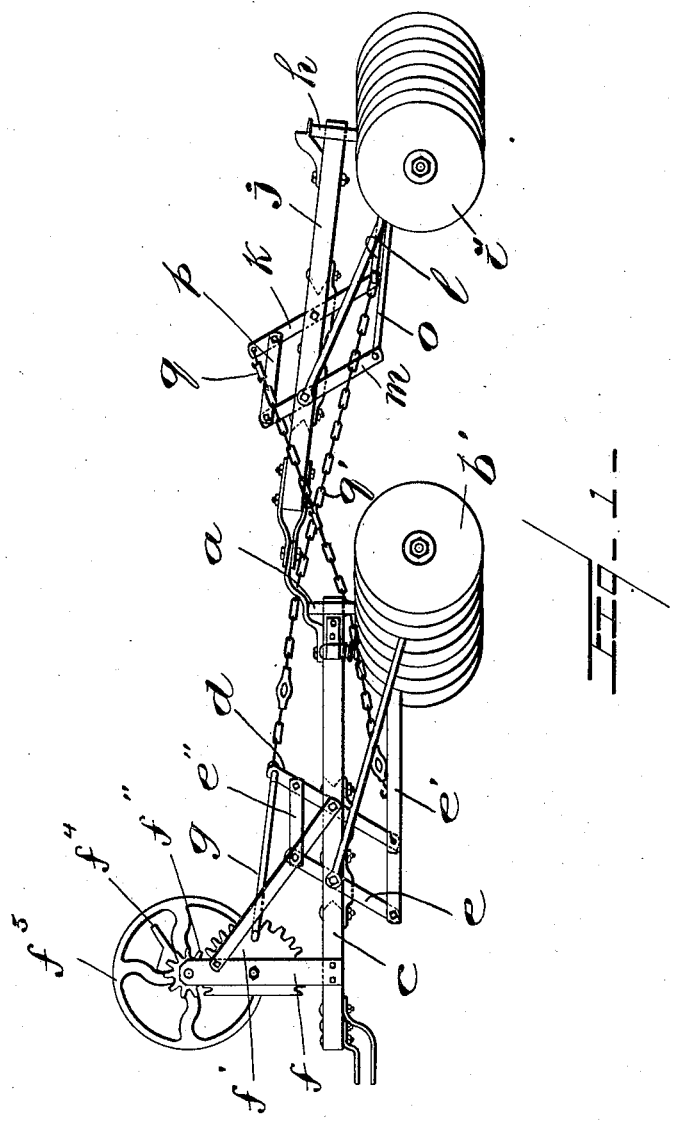

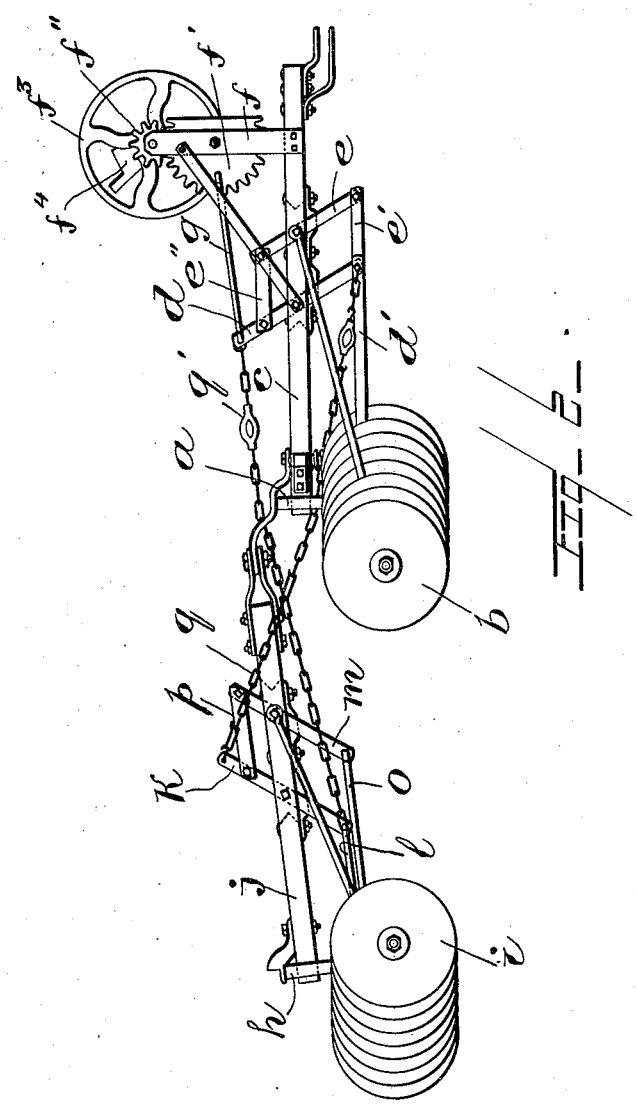

UNITED STATES PATENT OFFICE.

TORRANCE EDWARD BISSELL, OF ELORA, ONTARIO, CANADA.

DISK HARROW.

1,388,159.     Specification of Letters Patent.     Patented Aug. 23, 1921.

Application filed August 14, 1920. Serial No. 403,551.

*To all whom it may concern:*

Be it known that I, TORRANCE EDWARD BISSELL, a British subject, residing in the town of Elora, in the county of Wellington and Province of Ontario, Dominion of Canada, have invented certain new and useful Improvements in Disk Harrows; and I hereby declare the following to be a full, clear, and exact description of the same.

This invention relates to a disk harrow comprising a train of harrow units, the disk gangs of which are simultaneously angled by a set of levers actuated from the front harrow unit; the object of the invention being to move these disk gangs from working to transport position without stopping or backing the harrow, the advantages of which are:

First, that the head lands are left level and in proper condition for planting, instead of high ridges;

Second, a waste of power is avoided, which results when the turns are made with the gangs in working position, and Third, when the harrow runs into difficult places, the actuating mechanism straightens the gangs and permits of the harrow being moved without trouble or loss of time.

In carrying out the invention the disk gangs of the front and back harrow units are each provided with a set of levers by which they are changed from working to transport position and back again from transport to working position, and the levers of the front harrow unit are so connected with the levers of the rear harrow unit that the operation of the levers of the front harrow unit will simultaneously operate those of the rear harrow unit, a suitable gear being provided and so connected with the levers of the front harrow unit as to effect the operation of the levers, as hereinafter set forth.

In the drawings:

Figure 1, is a side elevational view of a disk harrow, constructed according to this invention, and Fig. 2, is a similar view from the opposite side.

Like characters of reference refer to like parts throughout the specification and drawings.

As the front and rear harrow units may be of any usual construction, only those features which are necessary for an understanding of the invention will be described in connection with this invention.

In the preferred type shown in the drawings, the front harrow unit comprises a beam $a$ to which is journaled two disk gangs $b$, $b'$, movable from a working to a transport position and back again, and a pole $c$ connected with the beam by which the harrow unit is coupled to a tractor or other motive power.

Fulcrumed to the pole $c$ is a lever $d$, connected with the disk gang $b$ by a connecting rod $d'$, pivotally attached at one end to the lever $d$ and at the other end to the disk gang.

Fulcrumed to the pole $c$ is a second lever $e$ and pivotally attached to the lower end of the lever $e$ is one end of the connecting rod $e'$, the other end of the connecting rod $e'$ being pivotally attached to the disk gang $b'$.

Pivotally connected with the upper end of the lever $e$, is one end of a connecting rod or link $e''$, the other end of which is pivotally connected with the lever $d$, so that the operation of the lever $d$, when angling the disk gang $b$ will simultaneously actuate the lever $e$ to angle the disk gang $b'$.

Rigidly fastened to the pole $c$, and extending vertically therefrom is a post $f$ and journaled to the post $f$ is a segmental gear wheel $f'$, which meshes with a pinion $f''$ on the hub of the handwheel $f^3$ journaled to the same post, the pinion $f''$ being provided with a brake $f^4$, which when operative prevents the rotation of the pinion and segmental gear wheel, and connecting the segmental gear wheel $f'$ with the upper end of the lever $d$ is a pitman $g$. During the rotation of the hand wheel the pinion $f''$ meshing with the segmental gear wheel $f'$ actuates the lever $d$, and through the connection of the latter with the lever $e$, selectively changes the angle of the disk gangs from working to transport position and back again.

The rear harrow unit comprises a beam $h$, disk gangs $i$, $i'$, journaled thereto, and a pole $j$ connected with the beam $h$ and pivotally or otherwise flexibly coupled to the front harrow unit.

Fulcrumed to the pole $j$ is a lever $k$, the lower end of which is connected with the disk gang $i$, by a connecting rod $l$. Fulcrumed to the pole $j$ is a second lever $m$, the lower end of which is connected with the disk gang $i'$ by a connecting rod $o$. The upper end of the lever $m$ is coupled to the lever $k$, by a connecting rod $p$, by which the actuation of the lever $k$, for angling the disk gang $i$, effects a simultaneous actuation of the lever $m$ for actuating the disk gang $i'$.

Connected with the upper end of the lever $k$, and with the lower end of the lever $d$ is a chain $q$ and connecting the lower end of the lever $k$ with the upper end of the lever $d$ is a chain $q'$.

When the handwheel $f^3$ is turned to angle the disk gangs or move them from transport to working position, the pinion $f''$ meshing with the segmental gear wheel $f'$ turns the latter in a direction which will cause the pitman $g$ to push or pull the upper end of the lever $d$. In the present case it is shown as pushing the upper end of the lever $d$ rearward, and throwing the lower end of that lever forward, this forward movement of the lower end of the lever $d$ drawing on the chain $q$ and causing it to pull the upper end of the lever $k$ forward and throw its lower end rearward.

This movement of the lever $k$, through the medium of the connecting rod $p$ actuates the lever $m$ and adjusts the disk gangs $i$, $i'$, simultaneously with the adjusting of the disk gangs $b$, $b'$, effected by the action of the levers $d$ and $e$ and the connecting rods $d'$, $e'$ and $e''$.

To bring the disk gangs back into transport position, and (or) to reverse the angle of the disk gangs the handwheel is turned in the opposite direction throwing the upper end of the lever $d$ forward from the position shown in the drawings. During this movement of the lever $d$, the chain $q'$ connected with the upper end of the lever $d$ and the lower end of the lever $k$ draws the lower end of the latter lever forward.

Cables or cords or other means within the scope of the claims may be substituted for the chains shown in the drawings, and, therefore, it is not desired to confine the invention to this specific means for coupling together the levers of the front and rear harrow units.

Having thus fully described my invention, what I claim as new and desire to secure by Letters Patent is:

1. A disk harrow comprising a train of harrow units, a set of levers for each unit to angle its respective disk gang, the levers of each set being connected for united movement, operable means having a rigid connection with one of the levers of the front unit, and flexible connections between said lever and the corresponding lever of the unit in rear for simultaneously angling all the disk gangs of the train.

2. A disk harrow comprising a train of harrow units, a set of levers for each unit to angle its respective disk gang, and operable means for actuating the disks gangs, a rigid connection between said means and one of the levers of the front unit and flexible connections between the set of levers for the front unit and those of the unit in rear for simultaneously angling the disk gangs of both units.

3. A disk harrow comprising a train of harrow units, a set of levers for each unit to angle its respective disk gang, operable means for actuating the levers, a pitman connecting the levers of the front unit with said means, and flexible means directly connecting the levers of the front and rear units.

4. A disk harrow comprising a train of harrow units, a set of levers for each unit to angle its respective disk gang, a gear wheel, a pitman connecting the levers of the front unit with the gear wheel, flexible means directly connecting the levers of said units and a hand wheel and pinion for actuating the gear wheel.

5. A disk harrow comprising a train of harrow units, a set of levers for each unit angling its respective disk gang, a gear wheel, a pitman connecting the levers of the front unit with said gear wheel, flexible means directly connecting the levers of said units, a hand wheel and a pinion for the hand wheel meshing with the gear wheel.

6. The combination with disk harrows arranged one in front of the other and flexibly connected, each having gang implements adjustable relatively to the line of draft, of a lever pivoted on each of said harrows, direct connections between said levers, a gear wheel rotatably mounted on one of said harrows, means for rotating the said gear wheel and a connection between the gear wheel and the lever pivoted to the same harrow.

7. Disk harrows arranged one in front of the other and flexibly connected, each having disk gangs adjustable relatively to the line of draft, a pair of connected levers pivoted on each of said harrows, and connections between said levers and the disk gangs, in combination with a rotatable gear on one of said harrows, a connection between the rotatable gear and one of the pair of levers pivoted to the same harrow and direct flexible connections between the pairs of levers whereby all of said gangs may be simultaneously adjusted by the rotation of said gear.

Elora, Ontario, June 26th, 1920.

TORRANCE EDWARD BISSELL.

Signed in the presence of—
Witnesses:
M. HARPER,
LLOYD E. BISSELL.